Dec. 12, 1933.  H. H. GORDON  1,938,828
LIGHTING SYSTEM FOR AUTOMOTIVE VEHICLES
Filed March 5, 1930
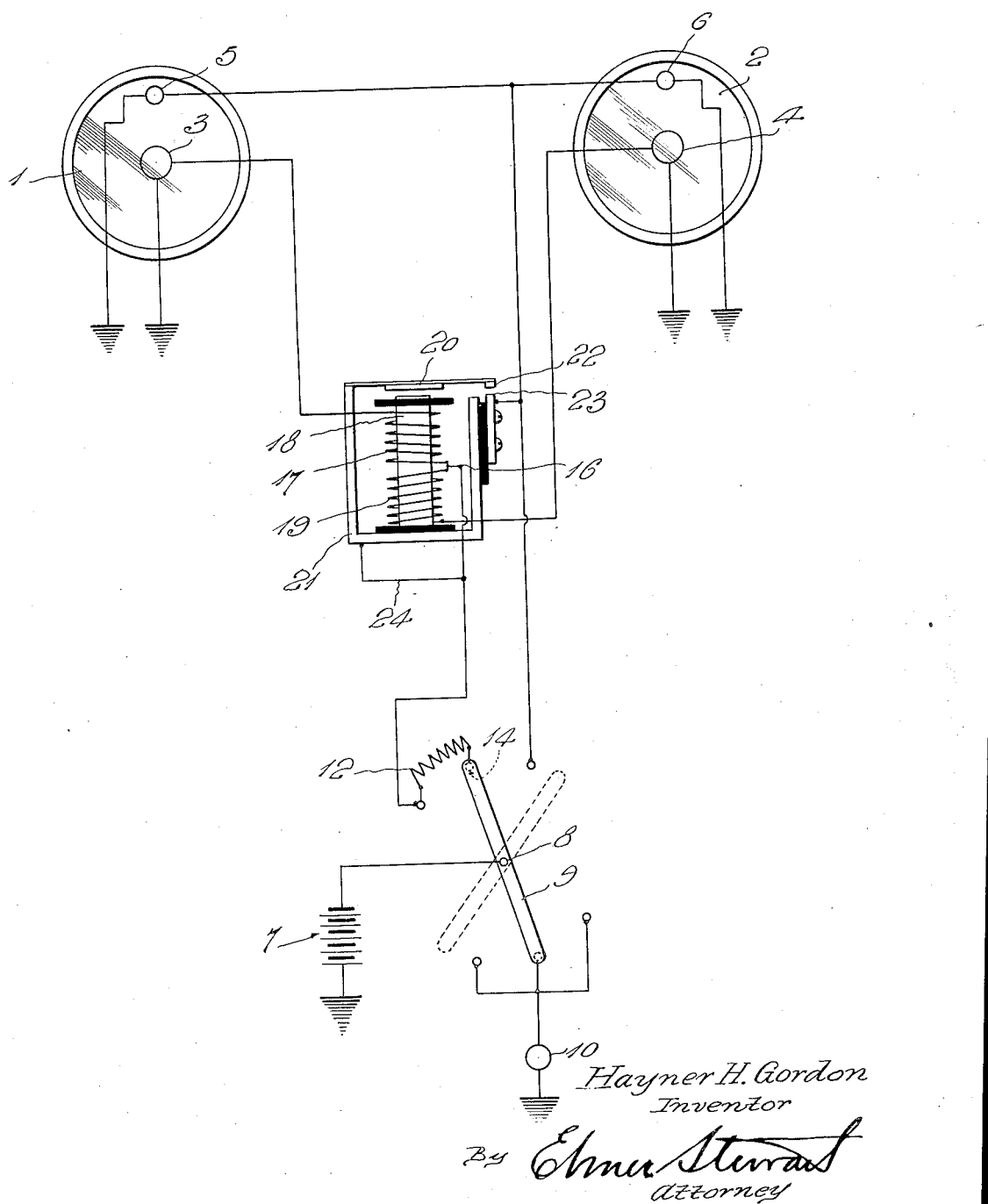
Hayner H. Gordon
Inventor
By Elmer Stewart
Attorney Patented Dec. 12, 1933

1,938,828

UNITED STATES PATENT OFFICE 1,938,828

LIGHTING SYSTEM FOR AUTOMOTIVE VEHICLES

Hayner H. Gordon, Washington, D. C., assignor, by direct and mesne assignments, to Lite Watchman, Corporation, New York, N. Y., a corporation of Delaware Application March 5, 1930. Serial No. 433,367

2 Claims. (Cl. 171—97)

The present invention relates to electrical lighting systems for automotive vehicles and is more particularly directed to an automatic safety device associated with front lights of automobiles.

When driving it is quite common to see automobiles with only one headlight burning, of which fact the operator of the vehicle is usually unaware. In other instances, the driver may be aware that but one headlight is operating, but he may not be possessed of the tools to remove the front of the lamp or a new bulb to insert in lieu of the burned out one.

Driving under these conditions is dangerous both to the driver of this vehicle and to the drivers of approaching vehicles, as it is impossible to tell whether the one light signifies the approach of a motor-cycle or a car, and it is of course impossible to ascertain whether it is the right hand headlight or left hand headlight which is burning, and therefore impossible to determine or gauge the amount of clearance to be given the approaching vehicle.

It is an object of the present invention to provide an electric lighting system for automotive vehicles which will automatically provide at all times for the forward projection of light rays from a pair of lights at the front of the vehicle.

It is a further object of the present invention to provide an arrangement of circuits and automatic electric control for such circuits of such nature that when either one of the headlight lamps in an automotive vehicle is extinguished, either through failure of the lamp itself or its supply circuit, an auxiliary or supplemental pair of front lights will be automatically turned on.

It is a still further object of the present invention to provide an automatic system of the type described which may be applied to any car having the conventional main and supplemental front lights, without any material alteration in the wiring system of the car.

Other objects will appear from the following detailed description of one embodiment of this invention, which is selected for the purpose of illustrating and describing the same.

In the embodiment shown in the drawing, 1 and 2 represent respectively the right hand and left hand headlights of an automotive vehicle. These headlights are of the character which are provided with the standard main lighting bulbs 3 and 4 and with the supplemental small parking light bulbs 5 and 6. These lights are supplied with energy from the battery 7, which may be of any suitable or conventional starting and lighting type. The lights are controlled by means of a lighting switch 8, which may also be of the conventional type. In the form shown, this lighting switch has four positions, the lower end 9 thereof controlling the tail light 10 and the upper arm 11 controlling the supplemental lights 5 and 6 and the main headlights 3 and 4, the latter through two positions, either dim or bright, the dim effect being obtained by means of a resistance 12. For the off position the top of the lighting switch will be swung to the extreme right as shown by the dotted lines. The first contact 13 to the left supplies energy to the lights 5 and 6. The second contact 14 to the left supplies energy through resistance 12 to the main lights 3 and 4, while contact 15 supplies energy to lights 3 and 4 without the interposition of resistance 12. The circuit which leads to the main lights 3 and 4 from contacts 14 and 15 is branched at the point 16 and leads to the lights through the separate circuits. Current for the light 3 passes through a winding 17 on the core 18 of a magnetic relay device. The energy supply for light 4 passes from point 16 through a similar winding 19 on the same core 18 and thence to the light 4. Windings 17 and 19 have the same number of turns and are so wound on the core 18 that their magnetic effects are in opposition during normal current flow to lamps 3 and 4. The armature 20 of the relay device which is mounted on the U-shaped frame member 21 is adapted, when attracted by the core 18, to close the movable contact 22 against the stationary contact 23. The movable contact 22 is connected to the frame of relay 21, which in turn is in metallic connection through wire 24 with the common wire to the main headlight bulbs leading from switch contact 15. When, therefore, contacts 22 and 23 are closed a supplemental supply of energy is furnished through an emergency circuit to the lights 5 and 6, which otherwise are not illuminated with the lighting switch in position on contacts 14 or 15. Wire 24 could if desired connect the frame of the relay 21 directly to the battery 7.

The operation of the device is as follows:

When the lighting switch 8 is in contact with either 14 or 15 the main lamps 3 and 4 are illuminated, either dim or brightly as the case may be. As long as current flow takes place to both lamps 3 and 4 the magnetic effects of windings 17 and 19 are balanced and there is no resultant magnetic force tending to act on armature 20. If, however, either lamp 3 or 4 burns out or the circuit to either of these lamps is otherwise interrupted, the current to the remaining lamp produces a magnetic effect in core 18, which is now no longer opposed. Armature 20 is thereby attracted, closing contacts 22 and 23 and immediately lighting the supplemental lights 5 and 6.

By way of example, it may be stated that with a standard six volt system, using twenty-one candlepower bulbs in the headlights, a magnetic core one inch long and five-sixteenths of an inch in diameter provided with sixty turns each of number 18 enameled wire for the windings 17 and 19, will give satisfactory results.

It is to be understood that the supplemental lights 5 and 6 may either be in the same reflector as lights 3 and 4, which is a more or less conventional form of headlight, or they may be in the form of separate lights, such as cowl lamps or front fender lamps.

It is to be also understood that the invention is sufficiently broad in scope to comprehend the use of a single bulb having two filaments, the contacts 21 and 23 in that instance functioning to light the extra filaments in the bulb.

It is to be understood that the embodiments of the invention which have been shown and described may be varied in substantial detail therefrom, as, for instance, in the preceding paragraph, without departing from the spirit of the invention as pointed out in the accompanying claims.

What I claim is:—

1. An electrical lighting system for automotive vehicles including in combination a pair of main front lights having a common ground return therefrom in said system, a pair of supplemental front lights, a source of energy, a manually controlled switching means, a circuit connecting said source of energy to said switching means, a circuit from said switching means to each of said main lights, a circuit from said switching means to said supplemental lights, an emergency circuit for supplying energy to said supplemental lights independently of whether said above-mentioned switching means has established a circuit thereto, a unitary magnetic circuit controlling device for closing said emergency circuit and including two series windings respectively located in said circuits from said switching means to said main lights, said magnetic device operating to close said emergency circuit upon cessation of current flow in either series winding while flow continues in the other winding.

2. An electrical lighting system for automotive vehicles including in combination two lighting systems capable of separate energization; having a common ground return therefrom in said system each of which comprises two light sources and electrical connections therefor; a source of electrical energy; means operable for selectively causing the energization of said lighting systems from said source of energy; switching means for connecting both lighting systems with the source of energy; and means for operating said switching means dependent for functioning upon the failure of energy flow to one of said light sources.

HAYNER H. GORDON.